H. FORD.
FAN CONSTRUCTION.
APPLICATION FILED JULY 10, 1918.
1,372,414. Patented Mar. 22, 1921.
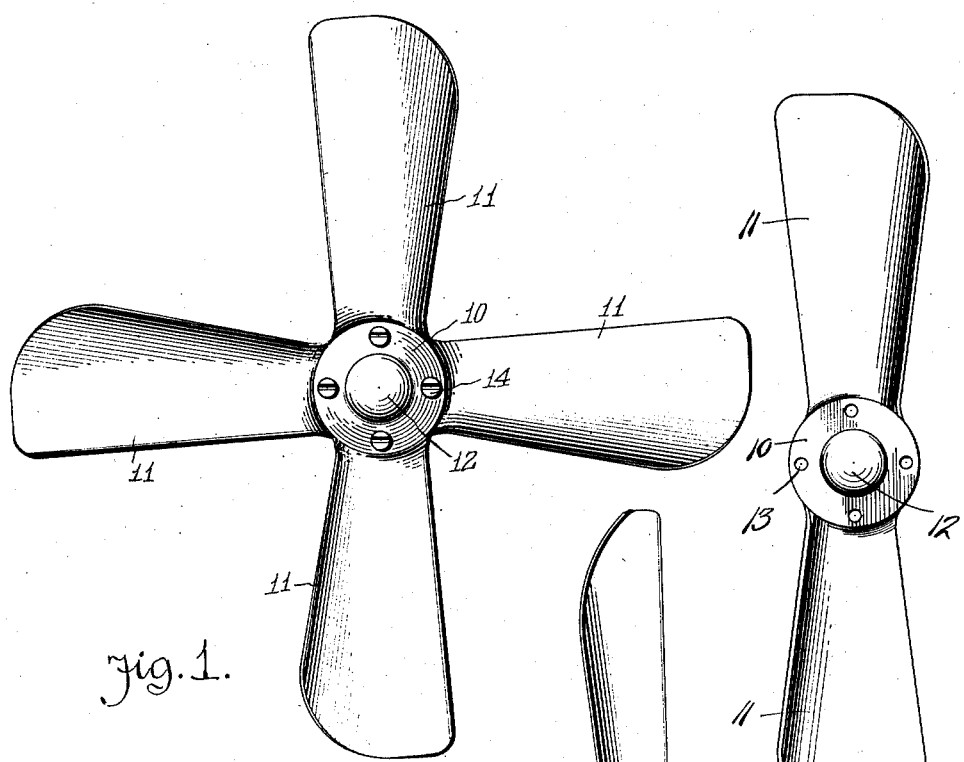
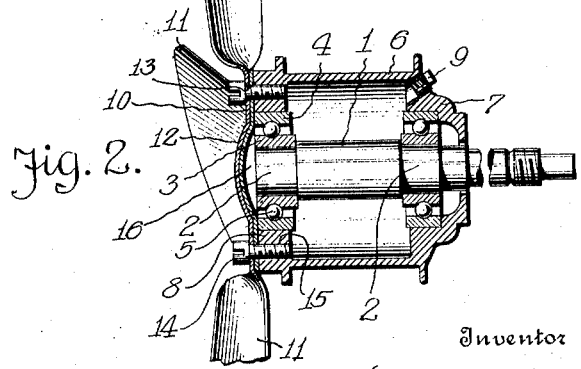
Witness
Chas. W. Stauffiger
Karl H. Butler
Inventor
Henry Ford,
By
Attorneys

UNITED STATES PATENT OFFICE.

HENRY FORD, OF DEARBORN, MICHIGAN.

FAN CONSTRUCTION.

1,372,414.　　　　Specification of Letters Patent.　　Patented Mar. 22, 1921.

Application filed July 10, 1918. Serial No. 244,153.

*To all whom it may concern:*

Be it known that I, HENRY FORD, a citizen of the United States of America, residing at Dearborn, in the county of Wayne and State of Michigan, have invented certain new and useful Improvements in Fan Construction, of which the following is a specification, reference being had therein to the accompanying drawings.

In my application filed April 15, 1918, Serial No. 228,591, for improvements in belt adjusting means, there are disclosed a belt pulley and a fan, such as forming a part of the cooling system associated with the power plant of a tractor or automobile. This application relates to the fan, *per se*, and the present invention aims to provide a two-part, four-bladed fan, the parts of which can be easily and quickly assembled in proper relation to form a rotary structure that may be readily attached to the end or face of a belt pulley, the attaching means serving as the fastening means for maintaining the parts of the fan together.

The present invention also aims to provide a pressed sheet metal fan construction that provides two matched or adjoining fan parts that afford a central lubricant holding recess or compartment, which in conjunction with a hollow belt pulley, to which the fan parts are connected, insures a thorough lubrication of the pulley bearings.

The construction entering into the present invention will be hereinafter described and then claimed, and reference will now be had to the drawing, wherein—

Figure 1 is a front elevation of the fan.

Fig. 2 is a side elevation of the same, partly in section and showing the fan attached to a belt pulley by which the fan is driven, and Fig. 3 is a front elevation of one pair of blades as stamped from sheet metal.

In the drawing, the reference numeral 1 denotes a stationary fan shaft having reduced portions 2 for anti-frictional pulley bearings, each composed of an inner race member 3, an outer race member 4, and a series of balls or rollers 5 between said race members.

6 denotes a flanged or grooved hollow belt pulley having end hub portions 7 and 8 and it is in these end hub portions that the race members 4 are mounted so that the belt pulley may freely revolve about the stationary fan shaft 1. The end of the portion 7 surrounds the inner end of the fan shaft 1 and said hub portion is provided with a detachable plug 9, so that a lubricant may be placed in the belt pulley 6.

10 denotes fan parts that are identical in construction, each fan part having two opposed blades 11 and an intermediate pressed out portion 12, surrounded by a circular portion, now designated 10, which is provided with a series of screw openings 13 for screw 14.

The fan parts 10 are stamped from sheet metal and pressed so that the blades 11 will have a desired angular relation with the blades in proper planes to set air in motion when the fan is revolved by a belt or power transmission member trained on the pulley 6. With the fan parts identical in construction and the screw holes 13 properly spaced, it is an extremely easy operation to assemble the fan parts with one part at a right angle to the other, whereby the blades 11 will be equally spaced and provide a four-bladed fan structure. With the screw holes 13 of one fan part registering or matched with the screw holes of the other fan part, the screw 14 can be easily placed in position and the end hub portion 8 of the belt pulley is tapped, as at 15, to receive screws 14. The circular portions 10 of the fan parts are therefore held in abutting relation against the end face or end hub portion 8 of the belt pulley 6, and the pressed out intermediate portions 12 provide a lubricant recess or compartment 16, which may receive lubricant from the hollow belt pulley 6 and insure a thorough lubrication of the outer antifrictional bearing.

By making the fan of two similar parts assembled as herein stated, the blades of the fan always have a defined and correct relation and the manufacture of such fans is inexpensive compared to the old way of separately making the blades and then attaching the same to a central hub portion. In my fan there is as great a rigidity, a saving of material and consequently minimum weight, all of which is essential to reduce the weight of a power plant of any kind of craft or vehicle.

What I claim is:—

1. A pressed sheet metal fan composed of similar parts placed at an angle to each other, and each part having an intermediate circular portion with a pressed out central portion, said intermediate and central portions fitting together and adapted to be held in abutting relation.

2. The combination of a hollow belt pulley adapted to receive lubricant, and fan parts connected to the end of said pulley and having intermediate pressed out portions adapted to coöperate with said hollow belt pulley in receiving a lubricant.

3. The combination with a hollow belt pulley having an end hub portion, of similar pressed steel metal fan parts disposed at a right angle to each other, and having intermediate portions in abutting relation connected to the end hub portion of said belt pulley and providing a lubricant recess at the end of said pulley.

4. The combination of a belt pulley having an end hub portion, similar sheet metal bladed fan parts having intermediate portions provided with screw openings, and screws extending through the screw openings of the intermediate portions of said fan parts into the end hub portion of said belt pulley and adapted to maintain said fan parts in engagement with said pulley and said fan parts fixed relative to each other.

In testimony whereof I affix my signature in the presence of two witnesses.

HENRY FORD.

Witnesses:
CHAS. E. SORENSEN,
ERNEST KANDLER.